(12) United States Patent
Urya et al.

(10) Patent No.: US 7,370,669 B2
(45) Date of Patent: May 13, 2008

(54) ELECTROMAGNETIC VALVE

(75) Inventors: Takuya Urya, Tokyo (JP); Yuta Ichinose, Tokyo (JP); Yoshihiko Onishi, Tokyo (JP); Manabu Miyaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 30 days.

(21) Appl. No.: 10/969,962

(22) Filed: Oct. 22, 2004

(65) Prior Publication Data

US 2005/0284524 A1 Dec. 29, 2005

(30) Foreign Application Priority Data

Jun. 29, 2004 (JP) ............................. 2004-191827

(51) Int. Cl.
*F15B 13/04* (2006.01)

(52) U.S. Cl. .............................. 137/596.1; 137/596.17; 137/812

(58) Field of Classification Search ............. 137/596.1, 137/596.17, 625.26, 625.65, 808, 812
See application file for complete search history.

(56) References Cited

U.S. PATENT DOCUMENTS

| | | | | |
|---|---|---|---|---|
| 4,375,226 A | * | 3/1983 | Loup | 137/625.65 |
| 5,104,091 A | * | 4/1992 | Rathay et al. | 251/129.14 |
| 5,163,474 A | * | 11/1992 | Rizk | 137/596.17 |
| 6,564,546 B2 | * | 5/2003 | Brown | 60/357 |
| 6,619,616 B1 | * | 9/2003 | Sudani et al. | 251/129.14 |
| 6,880,570 B2 | * | 4/2005 | Moreno et al. | 137/596.17 |

FOREIGN PATENT DOCUMENTS

| | | |
|---|---|---|
| DE | 74 40 072 U | 6/1975 |
| DE | 198 82 903 T1 | 11/2000 |
| JP | 2002-286152 A | 10/2002 |
| JP | 3414253 B2 | 4/2003 |

\* cited by examiner

*Primary Examiner*—Ramesh Kirshnamurthy
*Assistant Examiner*—Craig Schneider
(74) *Attorney, Agent, or Firm*—Sughrue Mion, PLLC (57) ABSTRACT

Disclosed is an electromagnetic valve in which a force due to a working fluid from an inflow hole acting perpendicularly with respect to the axis of a shut-off valve is reduced to thereby reduce the sliding resistance of the shut-off valve. An electromagnetic valve according to the present invention includes: a housing (10) having an inflow hole (11), an inner flow path (12), and a discharge hole (13); a valve seat (15) secured in position inside the housing (10); a shut-off valve (16) adapted to abut one surface of the valve seat (15) to shut off the working fluid flowing into the inner flow path (12) through the inflow hole (11); and a pressure regulating valve (17) provided coaxially with the shut-off valve (16) and adapted to control, through adjustment of the dimensions of a gap between itself and the other surface of the valve seat (15), the amount of working fluid flowing to the exterior of the housing (10) through the discharge hole (13). In the electromagnetic valve, the housing (10) is equipped with a whirling member for causing the working fluid having flowed into the inner flow path (12) through the inflow hole (11) to whirl in one direction.

30 Claims, 4 Drawing Sheets

$$\tan \alpha_{min} = \frac{d}{\pi D}$$

FIG. 8

# ELECTROMAGNETIC VALVE

BACKGROUND OF THE INVENTION

1. Field of the Invention

Figure 8:
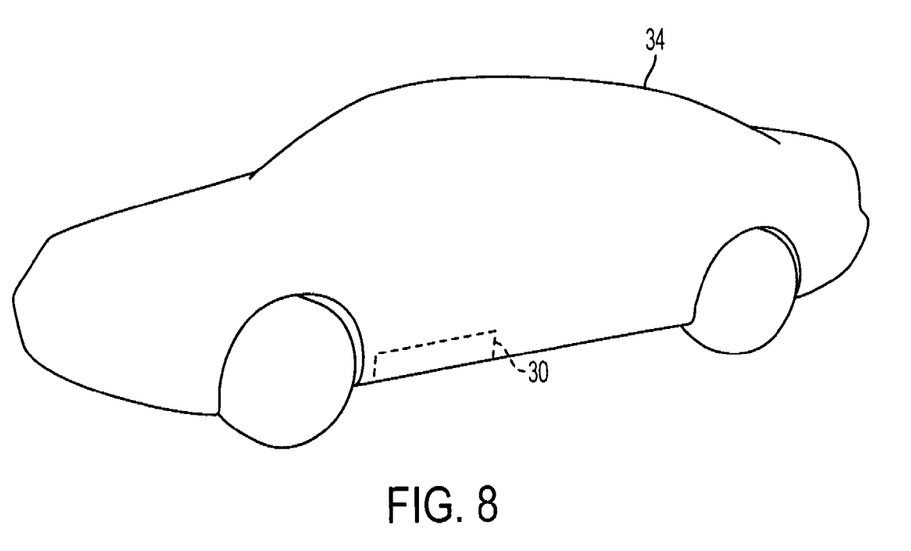
FIG. 8 is an illustration of an automatic transmission in an automobile that may be used with the inventive hydraulic valve.

The present invention relates to an electromagnetic valve to be provided, for example, in a hydraulic control circuit of an automatic transmission of an automobile, FIG. 8 is an illustration of an automatic transmission of the prior art that may be used with the inventive hydraulic valve.

2. Description of the Related Art

Conventionally, an electromagnetic valve has been known in which a spool, which is accommodated in a valve housing so as to be capable of reciprocating, rests at a position where equilibrium is attained between the following forces: the urging force of a coil spring urging the spool toward a linear solenoid, a driving force generated by a current supplied to a coil which causes a plunger to be attracted to an attracting portion to thereby cause a shaft to push the spool, and a force received by the spool from an oil chamber of a feedback chamber (see, for example, JP 2003-139261 A (FIG. 1)).

However, the housing has an input port formed so as to be perpendicular to the axis of the spool, so that working fluid having passed the input port is guided to the interior of the housing of the electromagnetic valve while perpendicularly colliding with the spool; thus, a lateral force due to the collision dynamic pressure of the working fluid acts on the spool, resulting in an increase in the sliding resistance during the operation of the spool and a sealing defect when shutting off the working fluid.

Further, the working fluid is divided, starting from the point at which it collides with the spool, into a plurality of flows along the outer peripheral surface thereof, and these flows join again on the opposite side of the inflow port, thus generating a complicated flow; thus, the working fluid undergoes a marked reduction in velocity and an increase in fluid resistance, resulting in a deterioration in the efficiency with which the working fluid is discharged through a discharge hole; further, foreign matter (contaminant) contained in the working fluid also enters the housing and undergoes a reduction in velocity as the working fluid is decelerated, and is liable to stay around the spool, with the result that foreign matter is caught between the sliding surfaces of the spool and the housing.

SUMMARY OF THE INVENTION

The present invention has been made with a view toward solving the above problems in the prior art. It is an object of the present invention to provide an electromagnetic valve in which a force due to a fluid from an inflow hole acting in a direction perpendicular to the axis of a first valve is reduced to thereby reduce the sliding resistance of the first valve and in which the fluid flowing in through the inflow hole flows smoothly through an inner flow path, achieving an improvement in terms of the efficiency with which the fluid is discharged through a discharge hole.

An electromagnetic valve according to the present invention includes: a housing having an inflow hole through which a fluid flows in, an inner flow path communicating with the inflow hole, and a discharge hole through which the fluid is discharged to an exterior; a valve seat secured in position inside the housing; a first valve adapted to abut one surface of the valve seat to shut off the fluid flowing into the inner flow path through the inflow hole; and a second valve provided coaxially with the first valve and adapted to control, through adjustment of a dimension of a gap between the second valve and the other surface of the valve seat, an amount of fluid flowing to the exterior of the housing through the discharge hole. In the electromagnetic valve, the housing is equipped with a whirling means for causing the fluid having flowed into the inner flow path through the inflow hole to whirl in one direction.

In the electromagnetic valve of the present invention, the force due to the fluid from the inflow hole acting in the direction perpendicular to the axis of the first valve is reduced to thereby reduce the sliding resistance of the first valve, and the fluid flowing in through the inflow hole flows smoothly through the inner flow path, thus achieving an improvement in terms of the efficiency with which the fluid is discharged through the discharge hole.

DESCRIPTION OF THE PREFERRED EMBODIMENTS

Embodiments of the present invention will now be described with reference to the drawings; the members and portions that are the same as or equivalent to each other are indicated by the same symbols.

Embodiment 1

Figure 1:
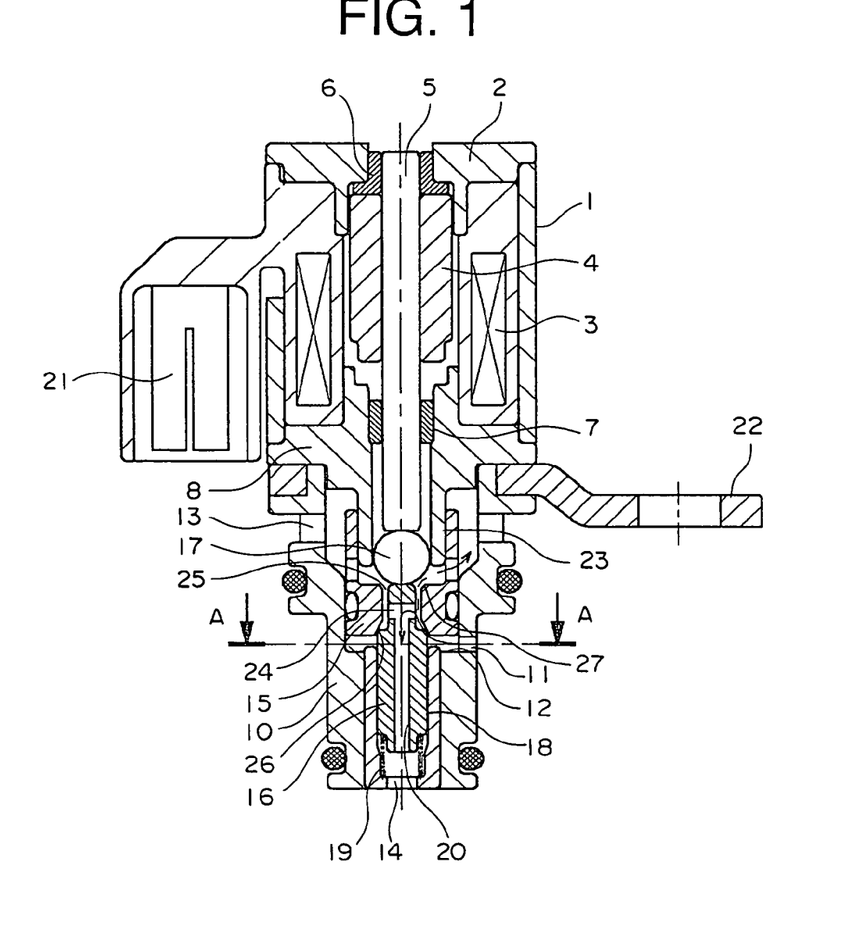
FIG. 1 is a front sectional view of a proportional electromagnetic valve for pressure control according to Embodiment 1 of the present invention.
Figure 2:
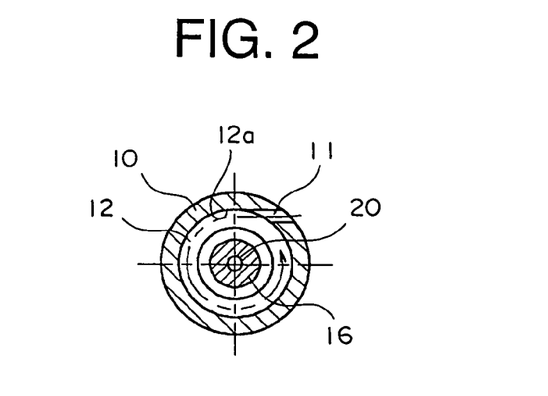
FIG. 2 is a sectional view taken in the direction of arrows A of FIG. 1.

FIG. 1 is a front sectional view of a proportional electromagnetic valve for pressure control according to Embodiment 1 of the present invention, and FIG. 2 is a sectional view taken in the direction of arrows A of FIG. 1.

This proportional electromagnetic valve for pressure control (hereinafter simply referred to as the electromagnetic valve) consists of a normally-low type three-way proportional electromagnetic valve for hydraulic control in an automatic transmission.

In this electromagnetic valve, a coil 3 is provided inside a yoke 1 and a plate 2 forming a magnetic circuit. A plunger 4 is provided on the inner side of the coil 3. A rod 5 extends through this plunger 4. At the ends of the rod 5, there are provided a first slide bearing 6 and a second slide bearing 7 supporting the rod 5 so as to allow it to move in the axial direction. Fixed to the yoke 1 is a core 8 axially opposed to the plunger 4 and surrounding the rod 5.

Fixed to the lower portion of the core 8 is a housing 10 locked to a flange 22. Inside the housing 10, there are formed an inflow hole 11 through which working fluid flows in, an inner flow path 12 communicating with the inflow hole 11, a discharge hole 13 through which the working fluid is discharged to the exterior, and an output hole 14.

Inside the housing 10, there is secured in position a valve seat 15 in which a through-hole 25 is formed so as to extend along the center axis. Under the valve seat 15 and inside the housing 10, there is secured in position a cylindrical sleeve 18. Provided inside the sleeve 18 is a shut-off valve 16 serving as a first valve which is coaxial with the rod 5 and which can vertical slide relative to the sleeve 18. The shut-off valve 16 is urged toward the valve seat 15 by the elastic force of a spring 19. The shut-off valve 16 has a passage 20 extending along the center axis, and, in the upper end portion of the passage 20, there are formed a pair of holes 24 opposed to the inner wall surface of the valve seat 15.

Under the core 8, there is provided a guide portion 23 extending toward the shut-off valve 16. A spherical pressure regulating valve 17, guided by the guide portion 23 and serving as a second valve, is provided between the rod 5 and the shut-off valve 16.

Provided in the housing 10 is a whirling means for whirling in one direction the working fluid flowing into the inner flow path 12 from the inflow hole 11. As shown in FIG. 2, in this embodiment, the whirling means is formed by a circular wall surface 12a of the inner flow path 12 and the inflow hole 11 which is in a plane perpendicular to the axis of the rod 5 and which extends tangentially with respect to the wall surface 12a.

Next, the operation of the electromagnetic valve constructed as described above will be illustrated.

First, at the time of non-energization, that is, when no current is flowing through the coil 3, the pressure regulating valve 17 is at the maximum lift position, and a shoulder portion 26 of the shut-off valve 16 is caused to abut the lower surface of the valve seat 15 by the elastic force of the spring 19. Thus, at this time, the working fluid, which enters the housing 10 through the inflow hole 11, is shut off by the shut-off valve 16, and the output hole 14 and the discharge hole 13 communicate with each other through the passage 20 and the holes 24 of the shut-off valve 16, with the pressure on the output hole 14 side being equal to the pressure on the discharge hole 13 side.

When an electric current is supplied to the coil 3 through a terminal 21, a magnetic line of force is generated in the coil 3, and a magnetic flux flows through the magnetic circuit formed by the plunger 4, the plate 2, the yoke 1, and the core 8, generating a magnetic attracting force between the plunger 4 and the core 8. As a result, the plunger 4 is attracted toward the core 8, and the rod 5, which is integral with the plunger 4, moves downwards, and the pressure regulating valve 17, which is in contact with the rod 5, also moves downwards against the repulsive force from the shut-off valve 16. At this time, the magnetic attracting force from the core 8, the elastic force of the spring 19, and the fluid force applied through the output hole 14 act on the pressure regulating valve 17, which moves downwards to a position where these forces are in equilibrium with each other.

At the same time, the shut-off valve 16, which is pressurized by the pressure regulating valve 17, also moves downwards, and the shoulder portion 26 of the shut-off valve 16 is separated from the lower surface of the valve seat 15, with the result that the working fluid is guided from the inflow hole 11 to the discharge hole 13 through the inner flow path 12, and, at the same time, from the inflow hole 11 to the output hole 14 through the inner flow path 12 and the passage 20.

The dimension of the gap between the lower surface of the valve seat 15 and the shoulder portion 26 of the shut-off valve 16 is proportional to the electric current flowing through the coil 3, and the output pressure applied through the output hole 14 is controlled linearly.

Further, when the shut-off valve 16, which is pressurized by the pressure regulating valve 17, moves downwards, the pressure regulating valve 17 abuts a shoulder portion 27 of the valve seat 15, and the working fluid is guided solely to the output hole 14 from the inflow hole 11 through the inner flow path 12 and the passage 20.

In the electromagnetic valve of this embodiment, the inflow hole 11 is provided so as to be in a plane perpendicular to the axis of the rod 5 and as to extend tangentially with respect to the wall surface 12a of the inner flow path 12, so that the working fluid flows in a whirl around the center axis of the shut-off valve 16, and the lateral force applied to the shut-off valve 16 is mitigated. Thus, the sliding resistance of the shut-off valve 16 inside the sleeve 18 is reduced, and it is possible to prevent a sealing defect, a characteristic defect, or adhesion of the working fluid to the inner surface of the sleeve 18 at the time of working fluid shut-off due to defective sliding.

Further, the supplied working fluid having passed the inflow hole 11 flows smoothly in the inner flow path 12 along the wall surface 12a thereof, and a reduction in velocity and pressure loss in the inner flow path 12 are mitigated. Thus, the efficiency with which the working fluid is discharged through the discharge hole 14 is improved, so that any foreign matter, which passes through the inflow hole 11 and enters the housing 10 together with the working fluid, is smoothly discharged through the discharge hole 13 together with the working fluid, and the amount of foreign matter staying in the vicinity of the shut-off valve 16 is reduced.

Embodiment 2

Figure 3:
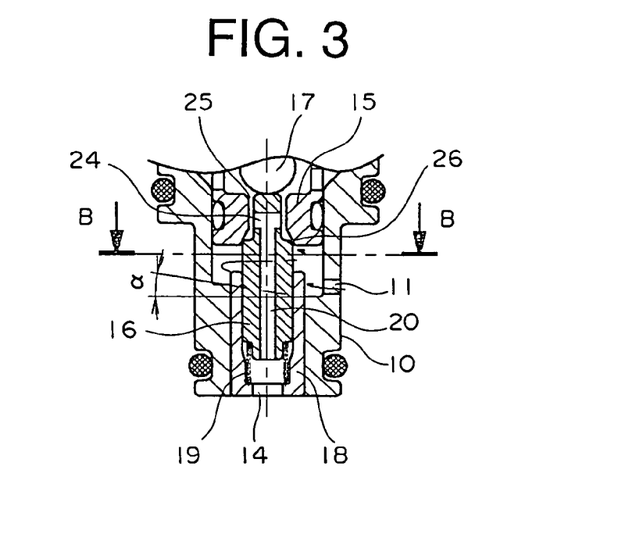
FIG. 3 is a front sectional view of a main portion of a proportional electromagnetic valve for pressure control according to Embodiment 2 of the present invention.
Figure 4:
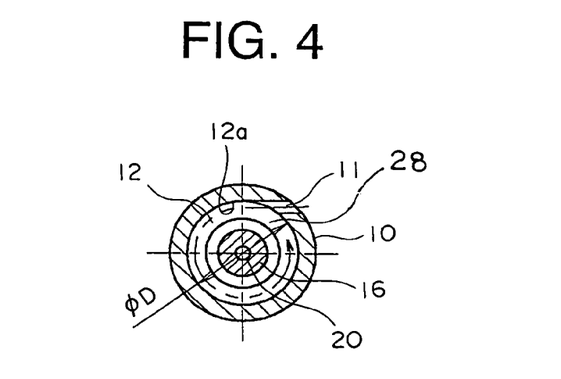
FIG. 4 is a sectional view taken in the direction of arrows B of FIG. 3.

FIG. 3 is a front sectional view of a main portion of a proportional electromagnetic valve for pressure control according to Embodiment 2 of the present invention, and FIG. 4 is a sectional view taken in the direction of arrows B of FIG. 3.

This embodiment differs from Embodiment 1 in that the inner flow path 12 has a bottom portion 28 formed in a spiral configuration; otherwise, it is of the same construction as Embodiment 1.

In this embodiment, the whirling means is formed by the wall surface 12a of the inner flow path 12 formed in a circular configuration, the inflow hole 11 in a plane perpendicular to the axis and extending tangentially with respect to the wall surface 12a, and the spirally formed bottom portion 28 of the inner flow path 12.

In this embodiment, the bottom portion 28 of the inner flow path 12 is spiral, so that the working fluid flowing in through the inflow hole 11 can, upon making a round along the wall surface 12a, reduce the amount thereof colliding with working fluid newly flowing in through the inflow hole 11, whereby it is possible to further stabilize the whirl flow of working fluid in the inner flow path 12.

Figure 5:
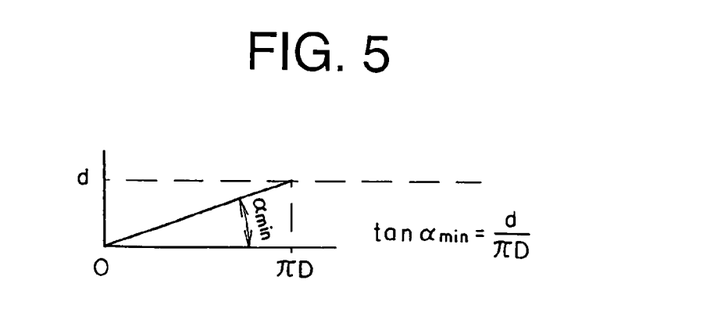
FIG. 5 is a diagram showing the relationship between lead per perimeter and the inner diameter of an inflow hole.

When an inclination angle a of the bottom portion 28 with respect to the plane perpendicular to the axis is a value larger than that obtained from the equation in FIG. 5, $\tan \alpha = d/\pi \times D$ (where d is the inner diameter of the inflow hole, and D is the inner diameter of the inner flow path 12), the lead per perimeter of the inner flow path 12 is larger than the inner diameter dimension of the inflow hole 11, so that it is possible to further stabilize the whirl flow of working fluid in the inner flow path 12.

It is to be noted that, from the viewpoint of workability, it is desirable to adopt a resin material for the housing 10 of Embodiment 2.

Embodiment 3

Figure 6:
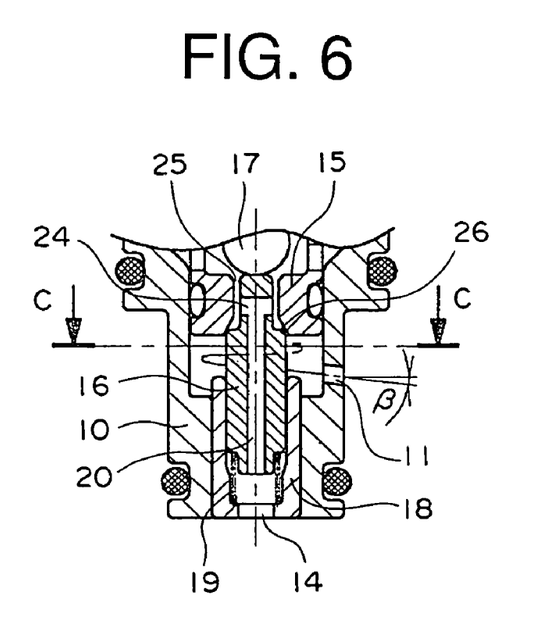
FIG. 6 is a front sectional view of a main portion of a proportional electromagnetic valve for pressure control according to Embodiment 3 of the present invention.
Figure 7:
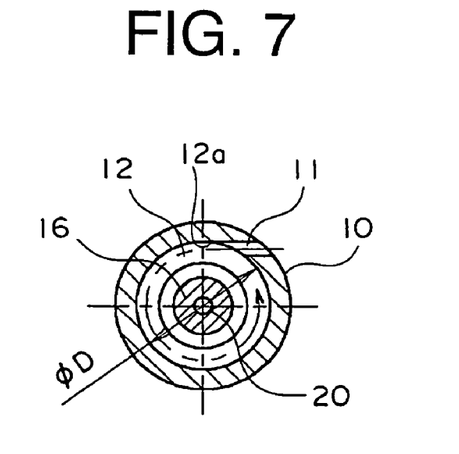
FIG. 7 is a sectional view taken in the direction of arrows C of FIG. 6.

FIG. 6 is a front sectional view of a main portion of a proportional electromagnetic valve for pressure control according to Embodiment 3 of the present invention, and FIG. 7 is a sectional view taken in the direction of arrows C of FIG. 6.

This embodiment differs from Embodiment 1 in that the inflow hole 11 is inclined with respect to the plane perpendicular to the axis; otherwise, it is of the same construction as Embodiment 1.

In this embodiment, the whirling means consists of the wall surface 12a of the inner flow path 12 formed in a circular configuration and the inflow hole 11 inclined with respect to the plane perpendicular to the axis and extending tangentially with respect to the wall surface.

In this embodiment, it is possible to obtain the same effect as that of Embodiment 1; further, since the inflow hole 11 is inclined with respect to the plane perpendicular to the axis, the working fluid having flowed in through the inflow hole 11 can, upon making a round along the wall surface 12a, reduce the amount thereof colliding with working fluid newly flowing in through the inflow hole 11, making it possible to further stabilize the whirl flow of working fluid in the inner flow path 12.

When an inclination angle β of the inflow hole 11 with respect to the plane perpendicular to the axis is a value larger than the value obtained by the equation: $\tan \beta = d/\pi \times D$ (where d is the inner diameter of the inflow hole, and D is the inner diameter of the inner flow path 12), the lead per perimeter of the inner flow path 12 is larger than the inner diameter dimension of the inflow hole 11, so that it is possible to further stabilize the whirl flow of working fluid in the inner flow path 12.

It is to be noted that, from the viewpoint of workability, it is desirable to adopt a metal material for the housing 10 of Embodiment 3.

FIG. 8 is an illustration of an automatic transmission 30 in an automobile 34 that may be used with the inventive hydraulic valve of the above-noted embodiments.

While the above-described embodiments are applied to a normally-low type electromagnetic valve, which is a three-way type proportional electromagnetic valve to be used for hydraulic control in an automatic transmission, they are also applicable to a normally-high type electromagnetic valve, in which the operating direction of the plunger upon energization is reversed.

Further, the present invention is also applicable to a so-called flow rate switching valve.

Further, while in the above-described embodiments the inflow hole 11 extends tangentially with respect to the wall surface 12a of the inner flow path 12 formed in a circular configuration, this should, of course, not be construed restrictively. For example, by forming the inflow hole in the housing so as to direct it between a radial axis of the shut-off valve and the wall surface of the inner flow path, it is possible to cause the working fluid flowing into the inner flow path through the inflow hole to whirl in one direction.

What is claimed is:

1. An electromagnetic valve comprising:
    a housing having an inflow hole conduit through which a fluid flows in, an inner flow path communicating with the inflow hole conduit, and a discharge hole through which the fluid is discharged to an exterior;
    a valve seat secured in position inside the housing;
    a first valve adapted to abut one surface of the valve seat to shut off the fluid flowing into the inner flow path through the inflow hole conduit, the first valve having an internal passage to permit the fluid to flow therethrough; and
    a second valve provided coaxially with the first valve and adapted to control through adjustment of a dimension of a gap between the second valve and another surface of the valve seat, an amount of fluid flowing to the exterior of the housing through the discharge hole,
    wherein the housing is equipped with a whirling means for causing the fluid having flowed into the inner flow path through the inflow hole conduit to whirl in one direction; and,
    wherein said whirling means is comprised of said inflow hole conduit uniformly extending from the exterior of the housing a distance to and tangentially penetrating into said inner flow path, said inflow hole conduit terminating completely within said inner flow path, whereby said fluid circulates peripherally and adjacent to an outer wall surface of said inner flow path.

2. An electromagnetic valve according to claim 1, wherein the whirling means comprises: a wall surface of the inner flow path which is formed in a circular configuration about a flow axis, said first valve seated within said inner flow path such that fluid flows in an annular manner between the wall surface of the inner flow path and the first valve; and the inflow hole conduit which is in a plane perpendicular to the flow axis.

3. An automobile including an automatic transmission, wherein the automatic transmission comprises a hydraulic control circuit including an electromagnetic valve according to claim 1.

4. An electromagnetic valve according to claim 1, wherein at least one hole is formed in the first valve opposed to an inner wall surface of the valve seat, the hole being in communication with the passage.

5. An electromagnetic valve according to claim 1, wherein the inner flow path extends around a circumference of the first valve.

6. An electromagnetic valve according to claim 1, wherein the inner flow path extends around a circumference of the first valve.

7. An electromagnetic valve according to claim 1, wherein the whirling means comprises: a wall surface of the inner flow path which is formed in a circular configuration; the inflow hole which is in a plane perpendicular to the axis and which extends tangentially with respect to the wall surface; and a bottom portion of the inner flow path formed in a spiral configuration.

8. An electromagnetic valve according to claim 7, wherein an inclination angle α of the bottom portion with respect to the plane perpendicular to the axis is larger than a value obtained from an equation: $\tan \alpha = d/\pi \times D$ (where d is an inner diameter of the inflow hole, and D is an inner diameter of the inner flow path).

9. An electromagnetic valve according to claim 1, wherein the whirling means comprises: a wall surface of the inner flow path which is formed in a circular configuration; and the inflow hole which is inclined with respect to a plane perpendicular to the axis and which extends tangentially with respect to the wall surface.

10. An electro magnetic valve according to claim 9, wherein a inclination angle β of the inflow hole with respect to the plane perpendicular to the axis is larger than a valve obtained from an equation: $\tan \beta = d/\pi \times D$ (where d is an inner diameter of the inflow hole, and D is an inner diameter of the inner flow path).

11. An electromagnetic valve according to claim 1, wherein the second valve has a spherical shape.

12. An electromagnetic valve according to claim 11, wherein another passage is formed between the second valve and the valve seat, such that the fluid flows around a portion of the second valve and out of the discharge hole.

13. An electromagnetic valve according to claim 1, wherein at least one hole is formed in the first valve opposed to an inner wall surface of the valve seat, the hole being in communication with the passage.

14. An electromagnetic valve according to claim 13, wherein another passage is formed between the second valve and the valve seat, such that the fluid flows around a portion of the second valve and out of the discharge hole.

15. A three-way proportional electromagnetic valve comprising:
a housing comprising a bore defining an inner flow path in an axial flow direction, said housing further comprising an output hole, a discharge hole, and an inflow hole conduit, wherein said output hole, discharge hole, and inflow hole conduit, provide fluid communication to the inner flow path so as to provide selective flow among the output hole, the discharge hole, and the inflow hole conduit via the inner flow path;
a valve seat provided in the inner flow path;
a shut-off valve provided within the inner flow path and resiliently urged against said valve seat to thereby block flow from the inflow hole conduit, the shut-off valve having an internal passage to permit fluid flow therethrough;
a plunger valve provided within the inner flow path;
a coil operable to reciprocate the plunger upon application of electrical potential to the coil so as to press against said shut off valve and control fluid flow into the inner flow path from the inflow hole conduit;
wherein said inflow hole conduit uniformly extends a distance to and tangentially penetrates into said inner flow path, said inflow hole conduit terminating completely within said inner flow path, so as to cause fluid to flow into the inner flow path and whirl about the shut-off valve.

16. An automobile including an automatic transmission, wherein the automatic transmission comprises a hydraulic control circuit including an electromagnetic valve according to claim 15.

17. An electromagnetic valve according to claim 15, wherein at least one hole is formed in the shut-off valve opposed to an inner wall surface of the valve seat, the hole being in communication with the passage.

18. An electromagnetic valve according to claim 15, wherein the inner flow path extends around a circumference of the first valve.

19. An electromagnetic valve according to claim 15, wherein a bottom portion of the inner flow path is formed in a spiral configuration.

20. An electromagnetic valve according to claim 19, wherein an inclination angle α of the bottom portion with respect to the plane perpendicular to the axial flow direction is larger than a value obtained from an equation: $\tan \alpha = d/\pi^* D$, where d is an inner diameter of the inflow hole path, and D is an inner diameter of the inner flow path.

21. An electromagnetic valve according to claim 15, wherein the inflow hole path is inclined with respect to a plane perpendicular to the axial flow direction.

22. An electro magnetic valve according to claim 21, wherein a inclination angle β of the inflow hole path with respect to the plane perpendicular to the axial flow direction is larger than a valve obtained from an equation: $\tan \beta = d/\pi^* D$ (where d is an inner diameter of the inflow hole, and D is an inner diameter of the inner flow path).

23. An electromagnetic valve comprising:
a housing having an inflow hole conduit through which a fluid flows in, an inner flow path communicating with the inflow hole conduit, and a discharge hole through which the fluid is discharged to an exterior;
a valve seat secured in position inside the housing;
a first valve adapted to abut one surface of the valve seat to shut off the fluid flowing into the inner flow path through the inflow hole conduit, the first valve having an internal passage to permit the fluid to flow therethrough;
a second valve provided coaxially with the first valve and adapted to control through adjustment of a dimension of a gap between the second valve and the other surface of the valve seat, an amount of fluid flowing to the exterior of the housing through the discharge hole,
wherein the housing is equipped with a whirling means for causing the fluid having flowed into the inner flow path through the inflow hole conduit to whirl in one direction; and,
wherein said whirling means is comprised of having said inflow hole conduit uniformly extend a distance from the exterior of the housing to and tangentially penetrate into said inner flow path, said inflow hole conduit terminating completely within said inner flow path, so as to cause fluid to flow into the inner flow path and whirl about the first valve.

24. An electromagnetic valve according to claim 23, wherein the whirling means comprises an outer wall surface of the inner flow path which is formed in a circular configuration and the inflow hole conduit which extends tangentially with respect to the wall surface.

25. An automobile including an automatic transmission, wherein the automatic transmission comprises a hydraulic control circuit including an electromagnetic valve according to claim 23.

26. An electromagnetic valve according to claim 23, wherein the second valve has a spherical shape.

27. An electromagnetic valve according to claim 23, wherein the whirling means comprises: a wall surface of the inner flow path which is formed in a circular configuration; the inflow hole which extends tangentially with respect to the wall surface; and a bottom portion of the inner flow path formed in a spiral configuration.

28. An electromagnetic valve according to claim 27, wherein an inclination angle α of the bottom portion with respect to the plane perpendicular to the axis is larger than a value obtained from an equation: $\tan \alpha = d/\pi^* D$ (where d is an inner diameter of the inflow hole, and D is an inner diameter of the inner flow path).

29. An electromagnetic valve according to claim 23, wherein the whirling means comprises: a wall surface of the inner flow path which is formed in a circular configuration; and the inflow hole which is inclined with respect to a plane perpendicular to the axis and which extends tangentially with respect to the wall surface.

30. An electro magnetic valve according to claim 29, wherein a inclination angle β of the inflow hole with respect to the plane perpendicular to the axis is larger than a valve obtained from an equation: $\tan \beta = d/\pi \ast D$ (where d is an inner diameter of the inflow hole, and D is an inner diameter of the inner flow path).

* * * * *

UNITED STATES PATENT AND TRADEMARK OFFICE
CERTIFICATE OF CORRECTION

PATENT NO. : 7,370,669 B2 Page 1 of 1
APPLICATION NO. : 10/969962
DATED : May 13, 2008
INVENTOR(S) : Takuya Uryu et al.

It is certified that error appears in the above-identified patent and that said Letters Patent is hereby corrected as shown below:

On the Title page item (75) should read as follows:
(75) Inventors: Takuya ~~Urya~~ Uryu, Tokyo (JP); Yuta Ichinose, Tokyo (JP); Yoshihiko Onishi, Tokyo (JP); Manabu Miyaki, Tokyo (JP)

Signed and Sealed this

Ninth Day of September, 2008

JON W. DUDAS
*Director of the United States Patent and Trademark Office*